United States Patent
Yamazaki et al.

(10) Patent No.: US 9,597,794 B2
(45) Date of Patent: Mar. 21, 2017

(54) ROBOT

(71) Applicant: Seiko Epson Corporation, Tokyo (JP)

(72) Inventors: Takema Yamazaki, Fujimi (JP);
Yoshinobu Goto, Azumino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/859,832

(22) Filed: Sep. 21, 2015

(65) Prior Publication Data
US 2016/0089775 A1    Mar. 31, 2016

(30) Foreign Application Priority Data
Sep. 30, 2014   (JP) ................................ 2014-200248

(51) Int. Cl.
| | | |
|---|---|---|
| B25J 9/10 | (2006.01) | |
| B25J 9/00 | (2006.01) | |
| B25J 19/00 | (2006.01) | |

(52) U.S. Cl.
CPC ........... *B25J 9/0009* (2013.01); *B25J 9/0087* (2013.01); *B25J 19/0029* (2013.01); *Y10S 901/19* (2013.01)

(58) Field of Classification Search
CPC .... B25J 9/0009; B25J 9/0087; B25J 19/0029; Y10S 901/19
USPC ........ 318/568.1, 568.11, 569; 901/2, 49, 50; 345/156, 161, 173, 204
See application file for complete search history.

(56) References Cited

U.S. PATENT DOCUMENTS

| | | | | |
|---|---|---|---|---|
| 6,408,252 | B1* | 6/2002 | De Smet | B82Y 30/00 702/22 |
| 6,791,291 | B2* | 9/2004 | Shimizu | B25J 9/1615 318/568.1 |
| 6,985,133 | B1* | 1/2006 | Rodomista | G06F 3/016 345/156 |
| 7,880,717 | B2* | 2/2011 | Berkley | G06F 3/016 318/560 |
| 8,443,694 | B2* | 5/2013 | Ihrke | B25J 9/126 74/490.05 |
| 8,459,647 | B2* | 6/2013 | Ferron | A63F 9/02 273/255 |
| 8,618,762 | B2* | 12/2013 | Reiland | B25J 9/1045 318/568.16 |
| 8,760,393 | B2* | 6/2014 | Berkley | G06F 3/016 345/156 |
| 8,857,874 | B2* | 10/2014 | Ihrke | B25J 9/104 294/106 |
| 8,868,241 | B2* | 10/2014 | Hart | B25J 9/1661 700/245 |
| 8,958,911 | B2* | 2/2015 | Wong | 700/258 |
| 9,120,224 | B2* | 9/2015 | Sanders | B25J 9/161 |
| 9,176,584 | B2* | 11/2015 | Berkley | G06F 3/016 |

(Continued)

FOREIGN PATENT DOCUMENTS

| | | | | |
|---|---|---|---|---|
| JP | 2013-099806 A | | 5/2013 | |
| JP | 2013099806 | * | 5/2013 | ............. B25J 13/08 |

*Primary Examiner* — Rita Leykin
(74) *Attorney, Agent, or Firm* — Harness, Dickey & Pierce, P.L.C.

(57) ABSTRACT

A robot includes a base part having a first cavity part inside, a torso part coupled to the base part, at least one arm unit provided on the torso part, and an inner box provided in the first cavity part and having a second cavity part opening in an upper portion. A circuit board for driving an actuator that operates the arm unit is provided on an outer side surface of the inner box.

3 Claims, 4 Drawing Sheets

(56) References Cited

U.S. PATENT DOCUMENTS

| 9,280,038 B1* | 3/2016 | Pan | G03B 17/561 |
| 2004/0127140 A1* | 7/2004 | Kelly | A63H 3/36 |
| | | | 446/268 |
| 2013/0019019 A1* | 1/2013 | Lam | H04L 67/34 |
| | | | 709/226 |

* cited by examiner

ROBOT

BACKGROUND

1. Technical Field

The present invention relates to a robot.

2. Related Art

Recently, robots having work arm units have been proposed (see Patent Document 1 (JP-A-2013-99806).

In the robot, a plurality of circuit boards forming a control apparatus are provided within a casing as a base on which a robot main body part having an arm unit is mounted. However, efficient arrangement of these circuit boards has not been sufficiently considered. Further, because of increase in the number of circuit boards, upsizing of the circuit boards, etc., there is a tendency that the circuit boards are densely packed within the casing, and noise and heat generation may be problematic. Therefore, in the point of view, a technology that enables efficient arrangement of the circuit boards within the casing is required. Further, in the robots of related art, downsizing, cost reduction, improvement in usability are desired.

SUMMARY

An advantage of some aspects of the invention is to solve at least a part of the problems described above, and the invention can be implemented as the following forms.

(1) An aspect of the invention provides a robot. The robot includes a base part having a first cavity part inside, a torso part coupled to the base part, at least one arm unit provided on the torso part, and an inner box provided in the first cavity part and having a second cavity part opening in an upper portion. A circuit board for driving an actuator that operates the arm unit is provided on an outer side surface of the inner box.

According to the robot of the aspect, the circuit board provided on the outer side surface of the inner box is directed toward the outside of the base part as a casing of the robot, and thereby, an advantage that maintenance of the circuit board is easier may be obtained and the circuit board may be efficiently provided in the first cavity part within the base part as the casing. Further, the circuit board is provided on the outer side surface around the second cavity part of the inner box, and thereby, the problem of heat generation can be suppressed by improvement of the heat dissipation effect.

(2) In the robot of the aspect, the second cavity part of the inner box may function as a housing part that houses a part of a cable connected between the actuator and the circuit board.

According to the robot of the aspect having the configuration, an extra length portion of the cable is housed in the housing part, and thereby, the circuit board may be efficiently provided within the base part as the casing.

(3) In the robot the aspect, a lifting mechanism of moving up and down the torso part with respect to the base part may be provided, and the housing part may house the cable in a length in response to rise and fall of the torso part.

According to the robot of the aspect having the configuration, the extra length portion of the cable changing in response to rise and fall of the torso part is housed in the housing part, and thereby, the circuit board may be efficiently provided within the base part as the casing.

(4) In the robot of the aspect, the inner box may have a rectangular parallelepiped shape having four of the outer side surfaces, the circuit board may have a plurality of circuit boards including at least a power supply circuit board and a drive circuit board containing a drive circuit of the actuator, the power supply circuit board may be provided on a first outer side surface of the four outer side surfaces, and the drive circuit board may be provided on at least one outer side surface of the two outer side surfaces adjacent to the first outer side surface.

According to the robot of the aspect having the configuration, noise generated from a cable connected between the actuator and the drive circuit board and noise generated from a cable for power supply from the power supply circuit board to the drive circuit board may be effectively separated and the influence of the noise on circuits of the other circuit boards may be effectively suppressed.

(5) In the robot of the aspect, in a view right in front of a front surface of the robot, a first arm unit provided on a left side of the torso part and a second arm unit provided on a right side of the torso part are provided, a first drive circuit board forming the drive circuit of the first arm unit may be provided on the outer side surface on a left side of the inner box, and a second drive circuit board forming the drive circuit of the second arm unit may be provided on the outer side surface on a right side of the inner box.

According to the robot of the aspect having the configuration, noise generated from a cable connected between the actuator and the first drive circuit board of the first arm unit and noise generated from a cable connected between the actuator and the second drive circuit board of the second arm unit, and noise from respective cables for power supply from the power supply circuit board to the first drive circuit board and the second drive circuit board may be effectively separated and the influence of the noise on the circuits of the other circuit boards may be effectively suppressed.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

Figure 1:
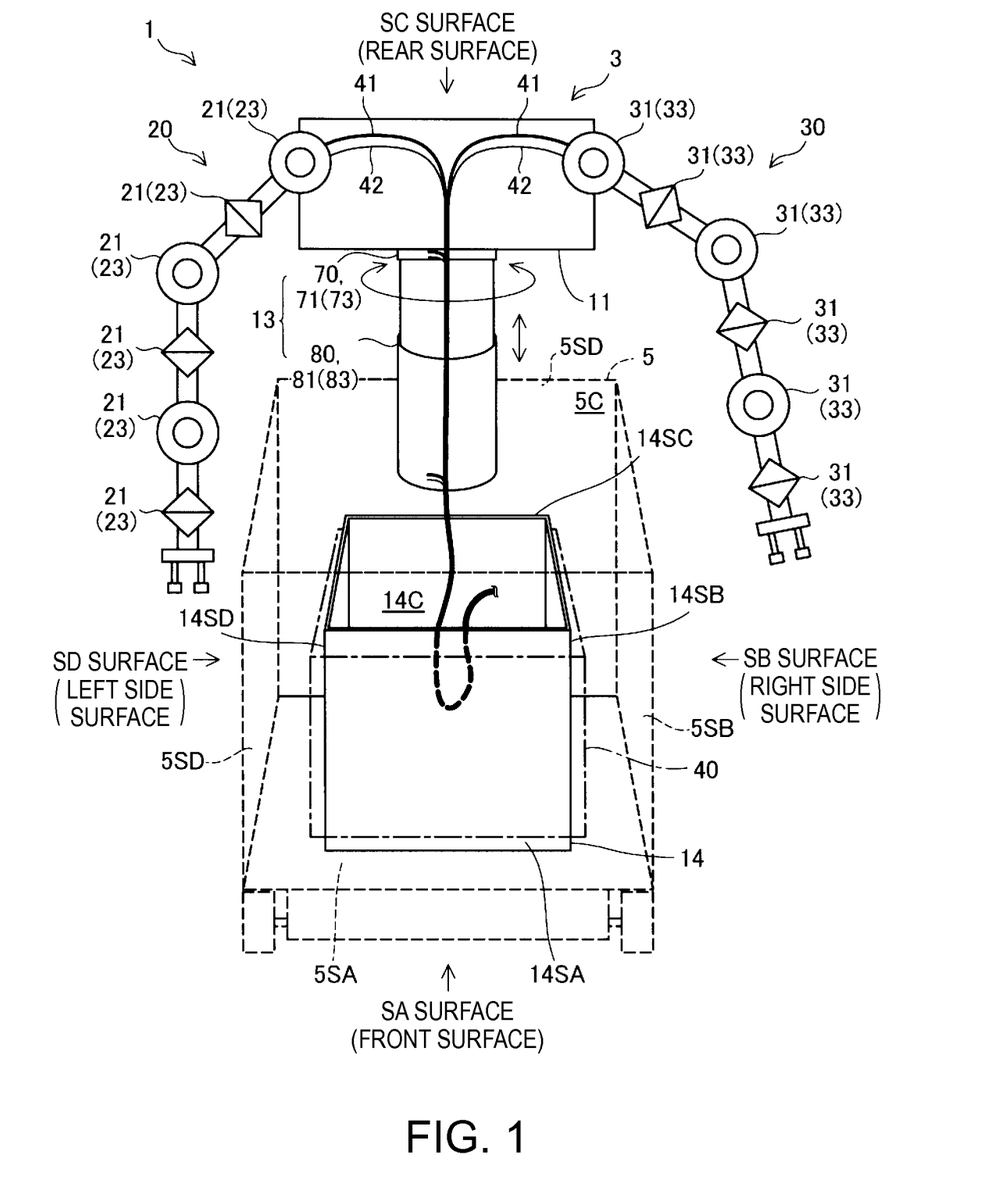
FIG. 1 is an explanatory diagram showing a schematic configuration of a robot as the first embodiment of the invention.

FIG. 1 is an explanatory diagram showing a schematic configuration of a robot 1 as the first embodiment of the invention. Note that, as below, the explanation will be made with the surface on the near side of the paper surface as "front surface (SA)", and, in a view right in front of the front surface (SA), the surface on the right side as "right side surface (SB surface)", the surface on the far side as "rear surface (SC surface)", and the surface on the left side as "left side surface (SD surface)".

The robot 1 includes a robot main body 3 and a robot control apparatus 40 that controls operation of the robot main body 3 (hereinafter, simply referred to as "control apparatus 40"). The robot main body 3 is a dual-arm robot and includes a base part (base) 5, a torso part 11, a coupling part 13 that couples the torso part 11 to the base part 5, and a first arm unit 20 and a second arm unit 30 provided on the torso part 11. The control apparatus 40 is provided inside of the base part 5.

The base part 5 has a nearly rectangular parallelepiped shape with a cavity part 5C inside and has four outer side surfaces 5SA to 5SD. The base part 5 has a frame (not shown), and the outer side surfaces 5SA to 5SD are detachably attached to the frame. On the bottom surface of the base part 5, wheels as a traveling mechanism for transfer are provided.

An inner box 14 is provided in the cavity part 5C. The inner box 14 has a nearly rectangular parallelepiped shape with a cavity part 14C opening in an upper portion, and has four outer side surfaces 14SA to 14SD. Circuit boards forming the control apparatus 40 are provided on these outer side surfaces 14SA to 14SD as will be described later. Note that the cavity part 14C functions as a housing part that houses parts of drive cables 41 and encoder cables 42, which will be described later.

The cavity part 5C and the cavity part 14C correspond to "first cavity part" and "second cavity part" according to the invention and will be also referred to as "first cavity part 5C" and "second cavity part 14C", respectively.

The coupling part 13 includes a rotation mechanism 70 that rotates the torso part 11 with respect to the base part 5 and a lifting mechanism 80 that moves up and down the torso part 11 with respect to the base part 5 in the vertical direction around the coupling part 13 in the coupled part to the torso part 11. The rotation mechanism 70 includes a rotation actuator 71, and the rotation actuator 71 includes an encoder 73 for detection of a rotation angle of the rotation actuator 71. Further, the lifting mechanism 80 includes a lifting actuator 81, and the lifting actuator 81 includes an encoder 83 for detection of a rotation angle of the lifting actuator 81. These actuators 71, 81 and encoders 73, 83 are connected to the control apparatus 40 via the drive cables 41 and the encoder cables 42. In the embodiment, motors are used as the actuators 71, 81.

The first arm unit 20 and the second arm unit 30 respectively have six shafts (joint shafts). For the respective shafts provided in the first arm unit 20, actuators 21 for operating the joints around the shafts are individually provided. Further, for the respective shafts provided in the second arm unit 30, actuators 31 for operating the joints around the shafts are individually provided. In the embodiment, motors are used as the actuators 21, 31. The respective actuators 21 provided in the first arm unit 20 individually include encoders 23 for detection of rotation angles of the actuators 21. Further, the respective actuators 31 provided in the second arm unit 30 individually include encoders 33 for detection of rotation angles of the actuators 31. The respective actuators 21, 31 and encoders 23, 33 are connected to the control apparatus 40 via the drive cables 41 and the encoder cables 42.

Figure 2:
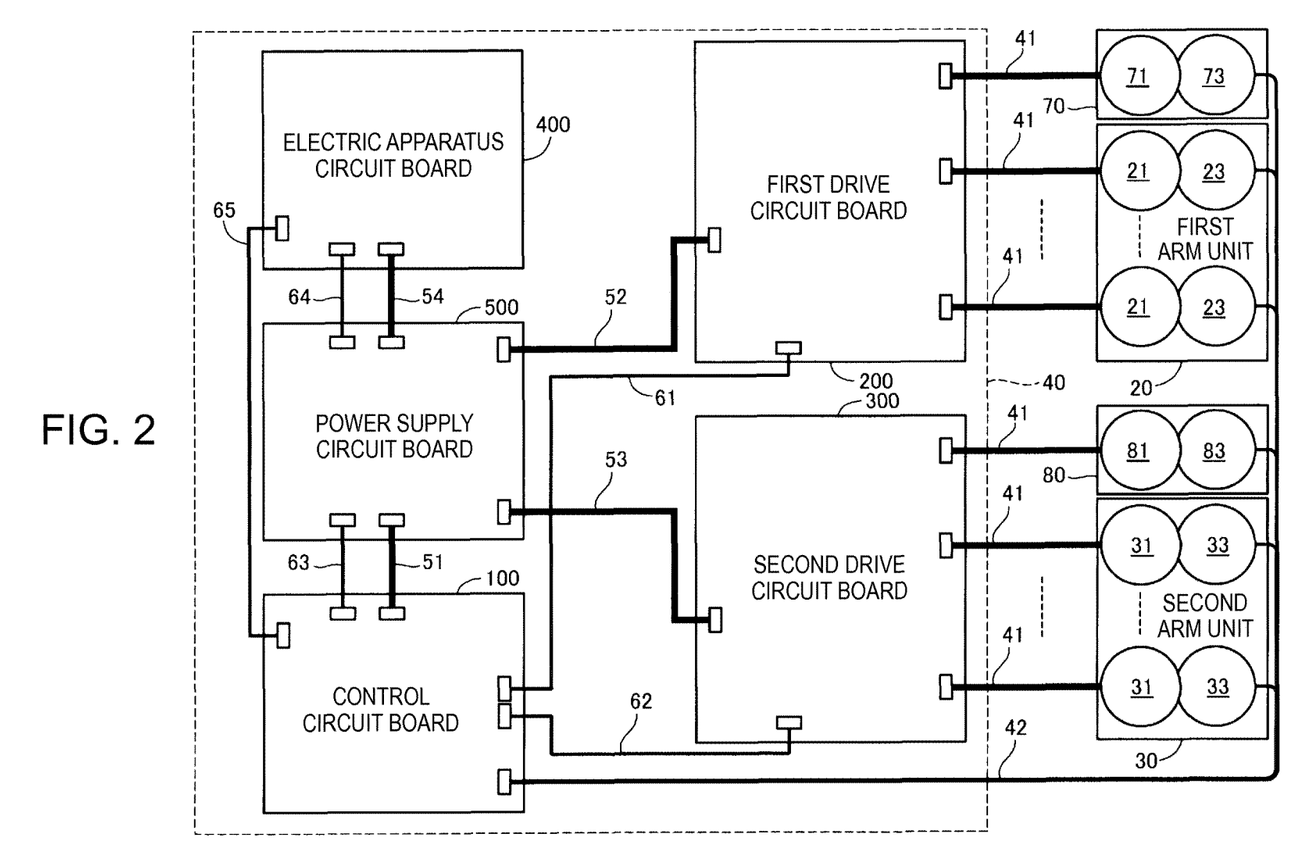
FIG. 2 is an explanatory diagram showing a configuration of a control apparatus.

FIG. 2 is an explanatory diagram showing a configuration of the control apparatus 40. The control apparatus 40 includes a control circuit board 100, a first drive circuit board 200, a second drive circuit board 300, an electric apparatus circuit board 400, and a power supply circuit board 500 as main circuit boards. Note that the respective circuit boards 100 to 400 are connected to the power supply circuit board 500 by power supply cables 51 to 54, and supplied with power from the power supply circuit board 500 having a power supply circuit via the power supply cables 51 to 54.

Pluralities of the drive cables 41 are respectively connected to the first drive circuit board 200 and the second drive circuit board 300. The respective drive cables 41 are connected to the corresponding actuators 21, 31 of the first arm unit 20 and the second arm unit 30, respectively. In the embodiment, the rotation actuator 71 is connected to the first drive circuit board 200 via the drive cable 41. Further, in the embodiment, the lifting actuator 81 is connected to the second drive circuit board 300 via the drive cable 41. Namely, in the embodiment, the first drive circuit board 200 has not only the drive circuits of the actuators 21 provided in the first arm unit 20 but also the drive circuit of the rotation actuator 71 for rotating the torso part 11. Further, in the embodiment, the second drive circuit board 300 has not only the drive circuits of the actuators 31 provided in the second arm unit 30 but also the drive circuit of the lifting actuator 81 for moving up and down the torso part 11. The respective encoders 23, 33, 73, 83 provided in the respective actuators 21, 31, 71, 81 are individually connected to the control circuit board 100 by the encoder cables 42.

Furthermore, a transmission cable 61 is connected between the first drive circuit board 200 and the control circuit board 100, and a transmission cable 62 is connected between the second drive circuit board 300 and the control circuit board 100.

In the first drive circuit board 200, drive signals for driving the rotation actuator 71 and the respective actuators 21 of the first arm unit 20 are generated based on a drive control signal of the first arm unit 20 and a rotation control signal of the torso part 11 supplied from the control circuit board 100 via the transmission cable 61. The generated drive signals are supplied to the rotation actuator 71 and the respective actuators 21 of the first arm unit 20 via the respective drive cables 41. The respective actuators 71, 21 are driven in response to the supplied drive signals, and the rotation of the torso part 11 and the operation of the first arm unit 20 are executed.

Further, in the second drive circuit board 300, drive signals for driving the lifting actuator 81 and the respective actuators 31 of the second arm unit 30 are generated based on a drive control signal of rise and fall of the second arm unit 30 and a lifting control signal of the torso part 11 supplied from the control circuit board 100 via the transmission cable 62. The generated drive signals are supplied to the lifting actuator 81 and the respective actuators 31 of the second arm unit 30 via the respective drive cables 41. The respective actuators 81, 31 are driven in response to the supplied drive signals, and the rise and fall of the torso part 11 and the operation of the second arm unit 30 are executed.

Note that the respective actuators 71, 81, 21, 31 are formed by the motors as described above. Therefore, circuits for driving general motors are applied to the drive circuits for driving the actuators. For example, the drive circuit includes an inverter circuit that outputs an alternating current (drive current) as a drive signal to the motor, a current detection circuit that detects the drive current, a gate driver circuit, and a pulse signal generation circuit that generates a pulse signal based on the control signals (drive control signal, rotation control signal, lifting control signal) supplied from the control circuit board 100 and the detected drive current and supplies the signal to the inverter circuit via the gate driver circuit.

The control circuit board 100 has a control circuit that controls the rotation and the rise and fall of the torso part 11 and controls the operations of the first arm unit 20 and the second arm unit 30. The control circuit may be formed using a computer including a CPU and a memory to execute a predetermined program stored in the memory by the CPU, or may be entirely formed by a hardware circuit. The control circuit board 100 is connected to the first drive circuit board 200 by the transmission cable 61 and supplies the drive control signal of the first arm unit 20 and the rotation control signal of the torso part 11 to the first drive circuit board 200 by the transmission cable 61. Further, the control circuit board 100 is connected to the second drive circuit board 300 by the transmission cable 62 and supplies the drive control signal of the second arm unit 30 and the lifting control signal of the torso part 11 to the second drive circuit board 300 by the transmission cable 62. The respective control signals indicate amounts of control (amounts of drive currents) of the respective actuators 21, 31, 71, 81 determined based on the required rotation and lifted position of the torso part 11, operated position of the first arm unit 20, operated position of the second arm unit 30, and signals indicating the rotation angles supplied from the respective encoders 23, 33, 73, 83 via the encoder cables 42.

Further, the control circuit board 100 has various circuits for operating various electric apparatuses etc. provided in the robot 1 in addition to the above described control circuit.

The control circuit board 100 is connected to the power supply circuit board 500 by a transmission cable 63. The control circuit board 100 supplies a control signal for controlling operation of the power supply circuit by the transmission cable 63 to control the operation of the power supply circuit.

The electric apparatus circuit board 400 is a circuit board on which various electric apparatuses including switches, breakers, and indicating lamps are mounted. The electric apparatus circuit board 400 is connected to the power supply circuit board 500 by a transmission cable 64, and, of the electric apparatuses mounted on the electric apparatus circuit board 400, the electric apparatuses as part of the power supply circuit are connected to the power supply circuit of the power supply circuit board 500. Further, the electric apparatus circuit board 400 is connected to the control circuit board 100 by a transmission cable 65, and, of the electric apparatuses mounted on the electric apparatus circuit board 400, the electric apparatuses as part of the control circuit are connected to the control circuit of the control circuit board 100.

The above described plurality of circuit boards 100 to 500 provided in the control apparatus 40 are characterized in the arrangement state in the inner box 14 as will be described later.

Figure 3:
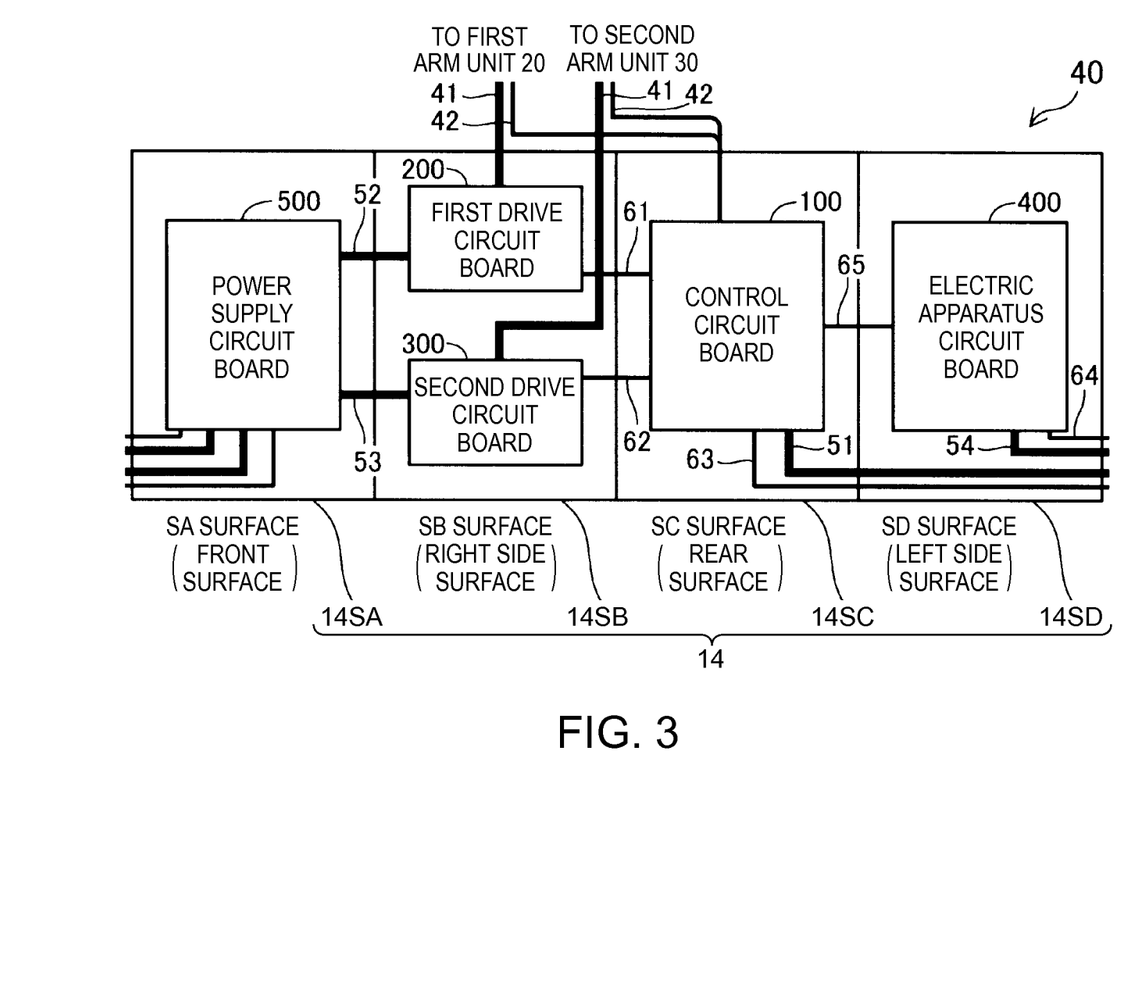
FIG. 3 is an explanatory diagram showing an arrangement state in an inner box of a plurality of circuit boards provided in the control apparatus.

FIG. 3 is an explanatory diagram showing an arrangement state in the inner box 14 of the plurality of circuit boards 100 to 500 provided in the control apparatus 40. FIG. 3 shows the four outer side surfaces 14SA to 14SD of the inner box 14 in development at a boundary between the outer side surface 14SA as the front surface (SA surface) and the outer side surface 14SD as the left side surface (SD surface) (see FIG. 1). Note that, as below, the outer side surface 14SA will be also referred to as "front surface 14SA", the outer side surface 14SB will be also referred to as "right side surface 14SB", the outer side surface 14SC will be also referred to as "rear surface 14SC", and the outer side surface 14SD will be also referred to as "left side surface 14SD".

The plurality of circuit boards 100 to 500 provided in the control apparatus 40 are provided on the four outer side surfaces 14SA to 14SD of the inner box 14 as shown in FIG. 3. Specifically, the power supply circuit board 500 is provided on the front surface 14SA, the first drive circuit board 200 and the second drive circuit board 300 are provided on the right side surface 14SB adjacent to the front surface 14SA. Further, the control circuit board 100 is provided on the rear surface 14SC, and the electric apparatus circuit board 400 is provided on the left side surface 14SD.

In the arrangement state of the circuit boards, the respective circuit boards 100 to 500 are provided on the four outer side surfaces 14SA to 14SD of the inner box 14 (see FIG. 1) toward the outside of the base part 5, and thereby, the conditions of the respective circuit boards 100 to 500 may be easily confirmed by detachment of the outer side surfaces 5SA to 5SD detachably attached to the base part 5. Therefore, maintenance of the respective circuit boards 100 to 500 is easier and the plurality of circuit boards 100 to 500 may be efficiently arranged within the base part 5. Further, the circuit boards are arranged on the outer side surfaces 14SA to 14SD around the second cavity part 14C, and thereby, the problem of heat generation can be suppressed by improvement of the heat dissipation effect by the first cavity part 5C covering the second cavity part 14C and the outer side surfaces 14SA to 14SD.

Further, the first drive circuit board 200 and the second drive circuit board 300 are provided on the right side surface 14SB adjacent to the front surface 14SA with the power supply circuit board 500 provided thereon. Thereby, an arrangement in which the power supply cables 52, 53 and the drive cables 41 connected to the drive circuit boards 200, 300 do not interfere with the circuits of the other circuit boards 100, 400 and the power supply cables 51, 54 and the transmission cables 61 to 65 connected to the circuit boards 100, 400 wherever possible may be formed. As a result, the respective drive cables 41 and power supply cables 52, 53 may be effectively separated so that the influence of noise generated from the respective drive cables 41 and power supply cables 52, 53 connected to the drive circuit boards 200, 300 on the circuits of the other circuit boards including the control circuit board 100 and the electric apparatus circuit board 400 may be suppressed.

Furthermore, as shown in FIG. 1, the second cavity part 14C of the inner box 14 surrounded by the four outer side surfaces 14SA to 14SD has a structure housing the extra length portions of the drive cables 41 and the encoder cables 42 connected to the first arm unit 20, the second arm unit 30, the rotation mechanism 70, and the lifting mechanism 80. Thereby, the extra length portions of the cables changing in response to the position of the torso part 11 moved up and down by the lifting mechanism 80 may be efficiently housed and the circuit boards 100 to 500 provided in the control apparatus 40 may be efficiently arranged within the base part 5.

Note that the arrangement state of the plurality of circuit boards 100 to 500 is not limited to the arrangement state shown in FIG. 3. For example, the two drive circuit boards 200, 300 may be provided on the left side surface 14SD adjacent to the front surface 14SA with the power supply circuit board 500 provided thereon, and the electric apparatus circuit board 400 may be provided on the right side surface 14SB. Or, the power supply circuit board 500 may be provided on the right side surface 14SB, the two drive circuit boards 200, 300 may be provided on the rear surface 14SC, the control circuit board 100 may be provided on the left side surface, and the electric apparatus circuit board 400 may be provided on the front surface 14SA. Namely, of the plurality of circuit boards 100 to 500 provided in the control apparatus 40, the power supply circuit board 500 may be provided on one outer side surface of the four outer side surfaces 14SA to 14SD of the inner box 14 and the two drive circuit boards 200, 300 may be provided on one outer side surface of the two outer side surfaces adjacent thereto.

B. Another Embodiment of Arrangement of Plurality of Circuit Boards

Figure 4:
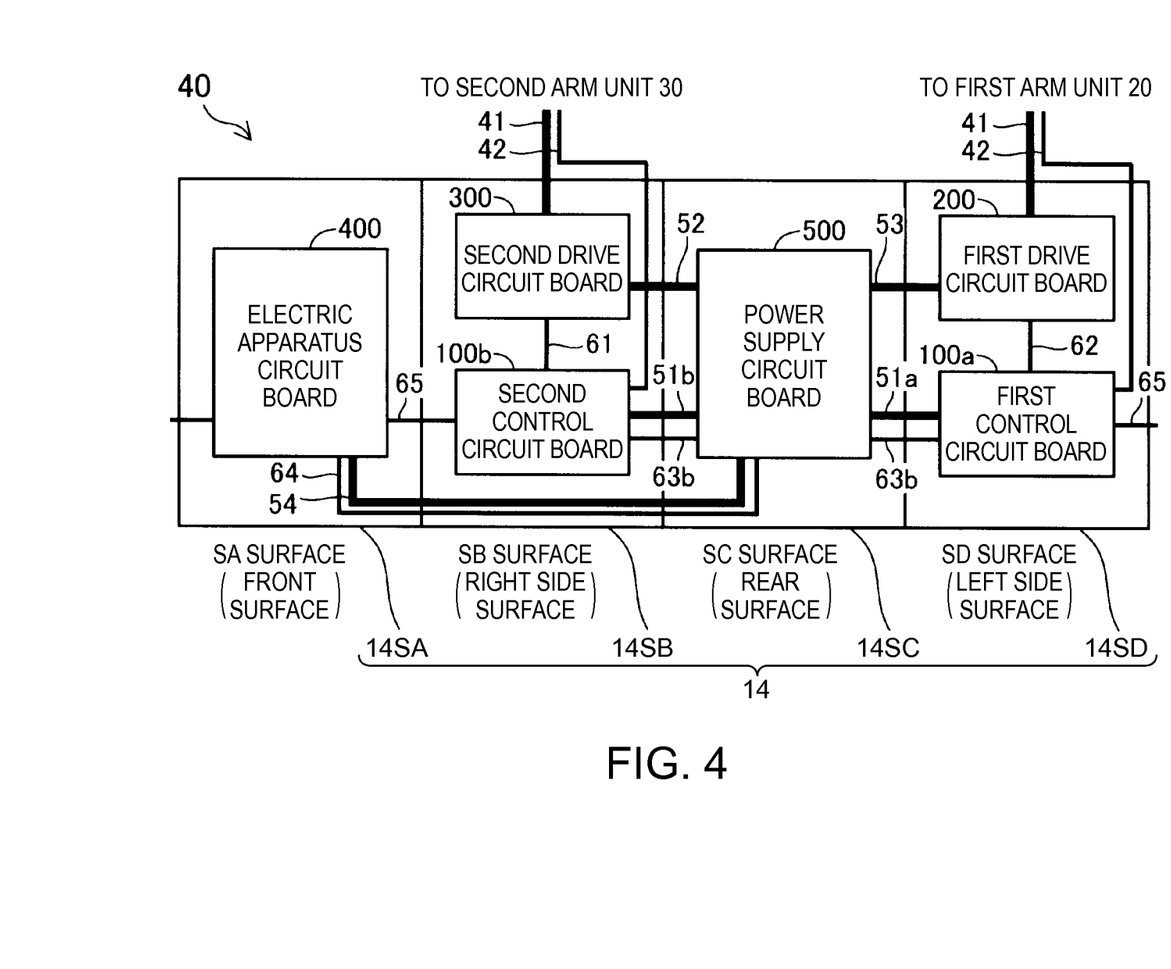
FIG. 4 is an explanatory diagram showing an arrangement state in the inner box of the plurality of circuit boards provided in the control apparatus as another embodiment.

FIG. 4 is an explanatory diagram showing an arrangement state in the inner box 14 of the plurality of circuit boards 100 to 500 provided in the control apparatus 40 as another embodiment. FIG. 4 shows the four outer side surfaces 14SA to 14SD of the inner box 14 in development at the boundary between the front surface 14SA and the left side surface 14SD like FIG. 3.

This embodiment is the same as the above described embodiment except that the control circuit board 100 is divided into a first control circuit board 100a and a second control circuit board 100b and provided in the inner box 14 as will be described later. The control circuit board 100 is divided by e.g. distribution of a part relating to the control of the first drive circuit board 200 on the first control circuit board 100a, apart relating to the control of the second drive circuit board 300 on the second control circuit board 100b, and the other parts on at least one of the first control circuit board 100a and the second control circuit board 100b. Note that the division is just an example and various divisions can be made.

As shown in FIG. 4, the power supply circuit board 500 is provided on the rear surface 14SC, the first drive circuit board 200 and the first control circuit board 100a are provided on the left side surface 14SD adjacent to the rear surface 14SC, the second drive circuit board 300 and the second control circuit board 100b are provided on the right side surface 14SB adjacent to the rear surface 14SC. Further, the electric apparatus circuit board 400 is provided on the front surface 14SA. Also, in this case, the respective circuit boards 100 (100a, 100b) to 500 are directed toward the outside of the base part 5 (see FIG. 1), and thereby, the conditions of the respective circuit boards 100 (100a, 100b) to 500 may be confirmed by detachment of the outer side surfaces 5SA to 5SD detachably attached to the base part 5. Therefore, maintenance of the respective circuit boards 100 (100a, 100b) to 500 is easier and the plurality of circuit boards 100 (100a, 100b) to 500 may be efficiently arranged within the base part 5. Further, the circuit boards are arranged on the outer side surfaces 14SA to 14SD around the second cavity part 14C, and thereby, the problem of heat generation can be suppressed by improvement of the heat dissipation effect by the first cavity part 5C covering the second cavity part 14C and the outer side surfaces 14SA to 14SD.

The first drive circuit board 200 is provided on the left side surface 14SD adjacent to the rear surface 14SC with the power supply circuit board 500 provided thereon, and the second drive circuit board 300 is provided on the right side surface 14SB adjacent to the rear surface 14SC. Thereby, an arrangement in which the power supply cables 52, 53 and the drive cables 41 connected to the drive circuit boards 200, 300 do not interfere with the circuits of the other circuit boards 100a, 100b, 400 and power supply cables 51a, 51b, 54 and transmission cables 61, 62, 63a, 63b, 64, 65a, 65b connected to the circuit boards 100a, 100b, 400 wherever possible may be formed. As a result, the respective drive cables 41 and power supply cables 52, 53 may be effectively separated so that the influence of noise generated from the respective drive cables 41 and power supply cables 52, 53 connected to the drive circuit boards 200, 300 on the circuits of the other circuit boards including the control circuit boards 100a, 100b and the electric apparatus circuit board 400 may be suppressed.

Note that the arrangement state of the circuit boards 100 (100a, 100b) to 500 is not limited to the arrangement state shown in FIG. 4. For example, the power supply circuit board 500 may be provided on the front surface 14SA, and the electric apparatus circuit board 400 may be provided on the rear surface 14SC. Or, the power supply circuit board 500 may be provided on the right side surface 14SB, the first drive circuit board 200 and the first control circuit board 100a may be provided on the front surface 14SA, the second drive circuit board 300 and the second control circuit board 100b may be provided on the rear surface 14SC, and the electric apparatus circuit board 400 may be provided on the left side surface 14SD. Namely, of the plurality of circuit boards 100 (100a, 100b) to 500 provided in the control apparatus 40, the power supply circuit board 500 may be provided on one outer side surface of the four outer side surfaces 14SA to 14SD of the inner box 14, and the first drive circuit board 200 may be provided on one outer side surface of the two outer side surfaces adjacent thereto and the second drive circuit board 300 may be provided on the other outer side surface.

C. MODIFIED EXAMPLES

Modified Example 1

In the above described embodiment, the drive circuit of the rotation mechanism 70 is provided on the first drive circuit board 200 and the drive circuit of the lifting mechanism 80 is provided on the second drive circuit board 300, however, not limited to that. The drive circuit of the rotation mechanism 70 may be provided on the second drive circuit board 300 and the drive circuit of the lifting mechanism 80 may be provided on the first drive circuit board 200. Or, the drive circuit of the rotation mechanism 70 and the drive circuit of the lifting mechanism 80 may be provided as individual drive circuit boards or a drive circuit board including the two drive circuits on the outer side surface on which the first drive circuit board 200 or the second drive circuit board 300 is provided.

Modified Example 2

In the above described embodiment, the case where the lifting mechanism 80 driven by the lifting actuator 81 is provided is explained as an example, however, a manually-operated lifting mechanism moved up and down by turning a wheel or the like may be employed. In this case, the drive circuit for lifting mechanism is omitted.

Or, the rotation mechanism 70 and the lifting mechanism 80 can be omitted and, in this case, the drive circuits for driving the mechanisms are omitted.

Modified Example 3

In the above described embodiment, only the wheels provided as the traveling mechanism for transfer is explained, however, an actuator for driving the wheels may be provided in the traveling mechanism. A drive circuit for traveling mechanism may be provided on the first drive circuit board 200 or the second drive circuit board 300, or a drive circuit board for traveling mechanism may be independently provided. It is preferable that the drive circuit board for traveling mechanism is provided on the outer side surface on which the first drive circuit board 200 or the second drive circuit board 300 is provided.

Modified Example 4

In the above described embodiment, the robot 1 respectively has the six shafts in the first arm unit 20 and the second arm unit 30. In this regard, the first arm unit 20 and the second arm unit 30 may have seven or more shafts or five or less shafts. Or, the first arm unit 20 and the second arm unit 30 may have different numbers of shafts.

Modified Example 5

In the above described embodiment, the robot 1 having the two arm units (the first arm unit 20 and the second arm unit 30) is explained as an example. In this regard, the robot may have one arm unit, or three or more arm units. Also, in this case, the drive circuit boards corresponding to the respective arm units may be provided on at least one outer side surface of the two outer side surfaces adjacent to the outer side surface of the inner box with the power supply circuit board provided thereon.

Modified Example 6

In the above described embodiment, the motors are used as the actuators 21, 31 for driving the respective shafts of the respective arm units, the rotation actuator 71, and the lifting actuator 81, however, other actuators may be used. For example, actuators that drive the respective joints by fluid pressure may be used.

The invention is not limited to the above described embodiment and modified examples and may be realized in various configurations without departing from the scope of the invention. For example, the technical features in the embodiment and the modified examples corresponding to the technical features in the respective configurations described in SUMMARY may be appropriately replaced and combined for solving part or all of the above described problems or achieving part or all of the above described advantages. Further, the technical features may be appropriately deleted without explanation as essentials in the specification.

The entire disclosure of Japanese Patent Application No. 2014-200248, filed Sep. 30, 2014 is expressly incorporated by reference herein.

What is claimed is:

1. A robot comprising:
    a base part having a first cavity part inside;
    a torso part coupled to the base part;
    at least one arm unit provided on the torso part;
    an inner box provided in the first cavity part and having a second cavity part opening in an upper portion; and
    a lifting mechanism moving up and down the torso part with respect to the base part,
    wherein a circuit board for driving an actuator that operates the arm unit is provided on an outer side surface of the inner box,
    wherein the second cavity part of the inner box functions as a housing part that houses a part of a cable connected between the actuator and the circuit board, and
    wherein the housing part houses the cable in a length in response to rise and fall of the torso part.

2. The robot according to claim 1, wherein the inner box has a rectangular parallelepiped shape having four of the outer side surfaces,
    the circuit board has a plurality of circuit boards including at least a power supply circuit board and a drive circuit board containing a drive circuit of the actuator,
    the power supply circuit board is provided on a first outer side surface of the four outer side surfaces, and
    the drive circuit board is provided on at least one outer side surface of the two outer side surfaces adjacent to the first outer side surface.

3. The robot according to claim 2, comprising, in a view right in front of a front surface of the robot, a first arm unit provided on a left side of the torso part and a second arm unit provided on a right side of the torso part,
    wherein a first drive circuit board forming the drive circuit of the first arm unit is provided on the outer side surface on a left side of the inner box, and
    a second drive circuit board forming the drive circuit of the second arm unit is provided on the outer side surface on a right side of the inner box.

* * * * *